United States Patent [19]

Favatella

[11] Patent Number: 4,643,034
[45] Date of Patent: Feb. 17, 1987

[54] GYROSCOPICALLY STABILIZED MAGNETIC SUSPENSION SYSTEM

[76] Inventor: David Favatella, 46 Gould St., Clifton, N.J. 07013

[21] Appl. No.: 599,014

[22] Filed: Apr. 11, 1984

[51] Int. Cl.⁴ .................. G01C 19/24; G01C 19/10
[52] U.S. Cl. ........................... 74/5.46; 74/5.7; 74/5.8; 310/90.5
[58] Field of Search .............. 74/5.8, 5.22, 5 R, 5.7, 74/5.46; 248/188.2, 176, 206.5; 308/10; 335/219, 285

[56] References Cited

U.S. PATENT DOCUMENTS

| | | | |
|---|---|---|---|
| 1,589,039 | 6/1926 | Anschutz-Kaempfe | 308/10 X |
| 3,044,309 | 7/1962 | Buchhold | 74/5 R |
| 3,233,950 | 2/1966 | Baermann | 308/10 |
| 3,794,391 | 2/1974 | Grosbard | 308/10 |
| 3,941,402 | 3/1976 | Yankowski et al. | 308/10 X |
| 3,954,310 | 5/1976 | Rava | 308/10 |
| 4,147,396 | 4/1979 | Lyman | 308/10 |
| 4,441,375 | 4/1984 | Minohara et al. | 74/5 R X |

FOREIGN PATENT DOCUMENTS

| | | | |
|---|---|---|---|
| 574516 | 3/1958 | Italy | 335/285 |
| 60719 | 5/1980 | Japan | 308/10 |

*Primary Examiner*—Rodney H. Bonck
*Attorney, Agent, or Firm*—Melvin K. Silverman; Joseph A. Giampapa

[57] ABSTRACT

The gyroscopically stabilized magnetic suspension system constitutes a base assembly which itself constitutes a narrow beam source of electromagnetic energy disposed at substantially the radial center of the base assembly. The base assembly also includes a first toroidal magnet surrounding the source of electromagnetic energy, the first toroidal magnet having a polarity transverse to its toroidal plane. Also provided within the base assembly are first anti-spin magnets disposed beyond the outer toroidal radius of the first toroidal magnet, the anti-spin magnets having the same magnetic axis as the first toroidal magnet but, however, having an opposite polarity thereto. The system also constitutes a suspended assembly itself constituting an electromagnetic energy receiving and converting means, and a motor disposed upon the electromagnetic receiving means and powered thereby, the motor having an axis of rotation and alignment with the axial center of the first toroidal magnet. Also included in the suspended assembly is a second toroidal magnet surrounding the motor and radially connected to the axis of the motor, the second toroidal magnet having its plane disposed parallel to the plane of the first toroidal magnet, the second toroidal magnet having a polarity transverse to its toroidal plane, the polarity opposite to the polarity of the first toroidal magnet, thereby forming a repulsion mode between the first and second toroidal magnets. Also included within the suspended assembly are second anit-spin magnets, thereby forming an attraction mode therebetween adapted to assure a stable perimeter about the rotating, suspended second toroidal magnet.

2 Claims, 3 Drawing Figures

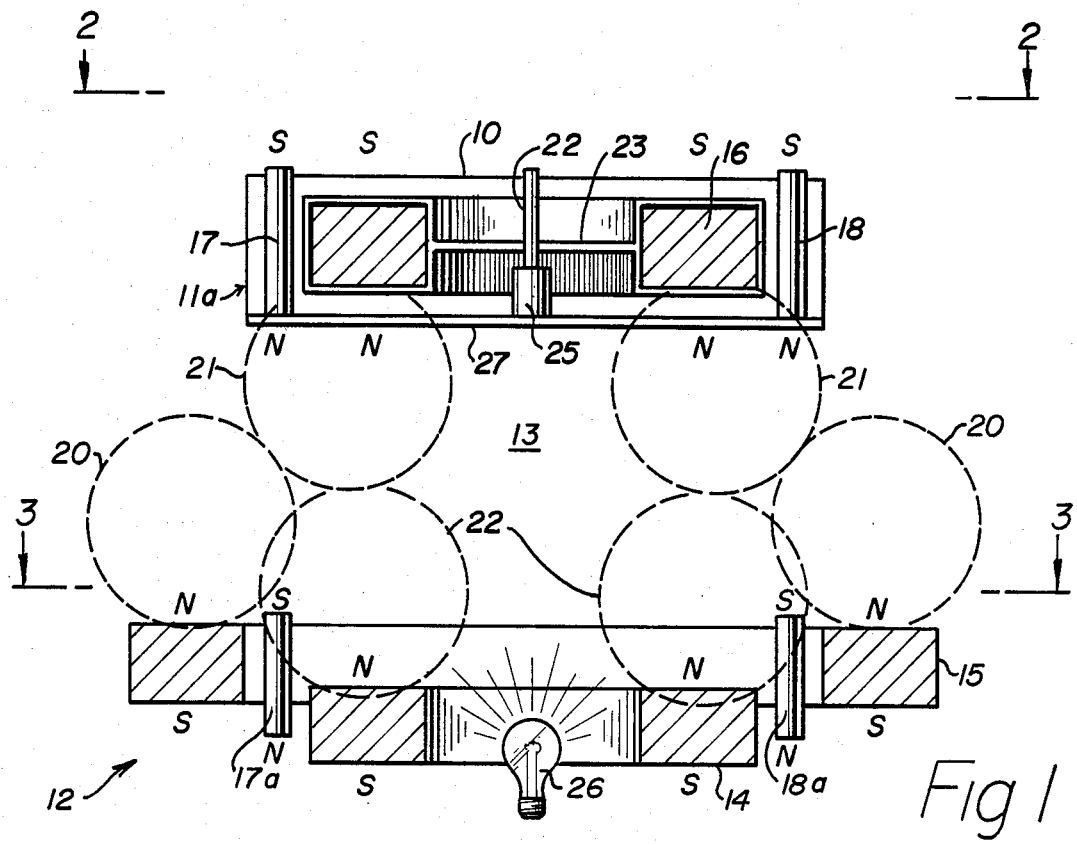
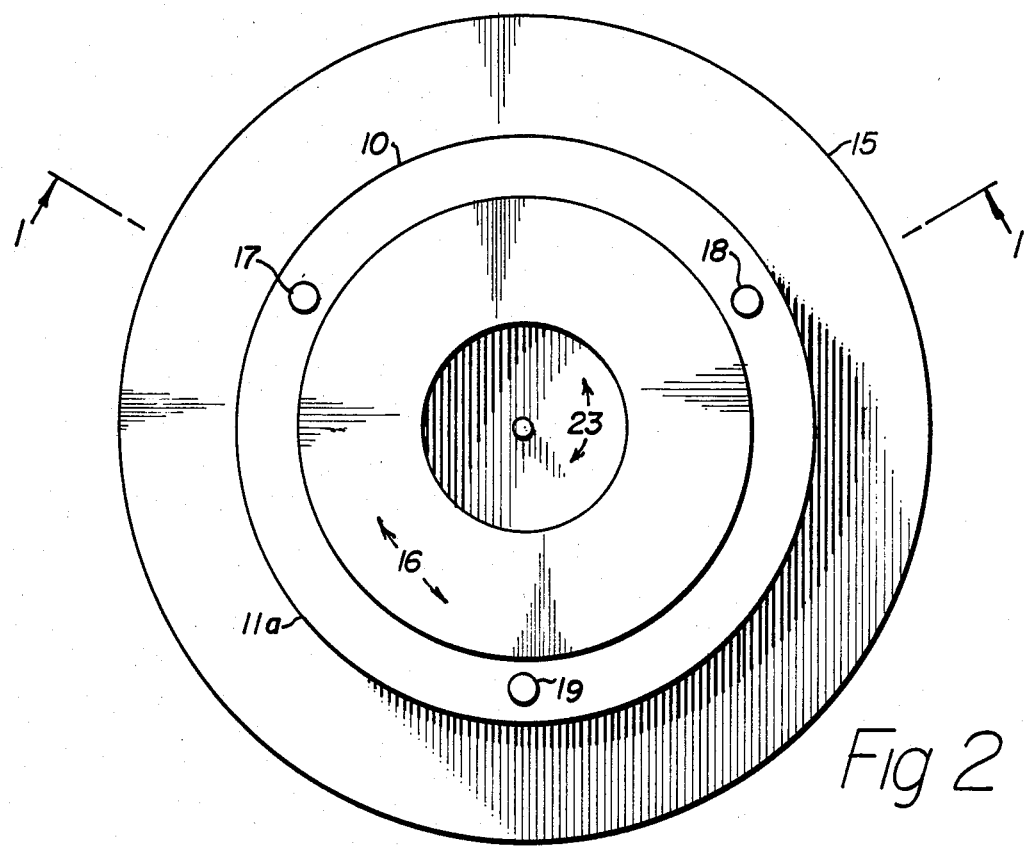

GYROSCOPICALLY STABILIZED MAGNETIC SUSPENSION SYSTEM

BACKGROUND OF THE INVENTION

The present invention relates to gyroscopes and, more particularly, to magnetically stabilized gyroscopes capable of defining a suspension system above a base area and at a uniform height thereabove.

The use of magnetic fields to accomplish a suspension and/or gyroscopic function is not completely unknown in the prior art. Examples thereof appear in U.S. Pat. Nos. 1,589,039 (1926) to Anschutz-Kaempfe, entitled *Gyroscopic Apparatus;* 3,794,391 (1974) to Grosbard, entitled *Magnetic Rotor Assembly;* and 3,941,402 (1976) to Yankowski, entitled *Electromagnetic Shock Absorber.*

The above prior art which is the most pertinent known to the inventor, does not define a free-standing system in which the gyroscopic element is capable of indefinite suspension above the plane of a base unit in opposition to the force of gravity. Additionally, all of the prior art known to the Applicant requires, for it to continue operation, a direct source of alternating current. Also, the related housing about the magnetically suspended element is, in the prior art, very close thereto, such that applications of such prior art apparatuses are considerably limited.

There exists many areas of testing in which the utility of a free-floating object would be useful in the measurement and study of fluid behavior on or about such an object. Also, the value, merely as a novelty item of such a structure is believed to be significant.

The instant invention is properly classified in one or more of the following areas: U.S. Class 308, Subclass 10; U.S. Class 335, Subclass 216, 219 and 285; and U.S. Class 248, Subclass 206.

SUMMARY OF THE INVENTION

The present invention is a gyroscopically stabilized magnetic suspension system comprising a base assembly which itself comprises a narrow beam source of electromagnetic energy disposed at substantially the radial center of the base assembly. The base assembly also includes a first toroidal magnet surrounding said source of electromagnetic energy, said first toroidal magnet having a polarity transverse to its toroidal plane. Also provided within the base assembly are first anti-spin magnets disposed beyond the outer toroidal radius of said first toroidal magnet, said anti-spin magnets having the same magnetic axis as said first toroidal magnet but, however, having an opposite polarity thereto. The inventive gyroscopic system also comprises a suspended assembly itself comprising an electromagnetic energy receiving and converting means, and a motor disposed upon said electromagnetic receiving means and powered thereby, said motor having an axis of rotation and alignment with the axial center of said first toroidal magnet. Also included in the suspended assembly is a second toroidal magnet surrounding said motor and radially connected to the axis of said motor, said second toroidal magnet having its plane disposed parallel to the plane of said first toroidal magnet, said second toroidal magnet having a polarity transverse to its toroidal plane, said polarity opposite to the polarity of said first toroidal magnet, thereby forming a repulsion mode between said first and second toroidal magnets. Also included within the suspended assembly are second anti-spin magnets having the same polarity as said first anti-spin magnets, thereby forming an attraction mode therebetween adapted to assure a stable perimeter about the rotating, suspended second toroidal magnet.

It is to be appreciated that the invention is predicated upon the inter-relationship of three phenomena; namely, repulsion between the two toroidal magnets, quantum mechanical reception of energy from the means which powers the motor axially located within the second toroid, and the attraction of the anti-spin magnets which act to define a stable circumferential plane necessary to the operation of a gyroscope.

It is an object of the present invention to provide a free-floating magnetically suspended gyroscope.

It is a further object to provide a novelty device having certain scientific, artistic and/or entertainment value.

The above and yet further objects and advantages of the present invention will become apparent from the hereinafter set forth detailed Description of the Invention, Drawings, and Claims appended herewith.

BRIEF DESCRIPTION OF THE DRAWINGS

FIG. 1 is a 120 degree polar segmental, schematic view showing, in cross-section, the suspended and base assemblies of the present invention.

FIG. 2 is a top schematic view of the suspended assembly.

DETAILED DESCRIPTION OF THE INVENTION

Figure 3:
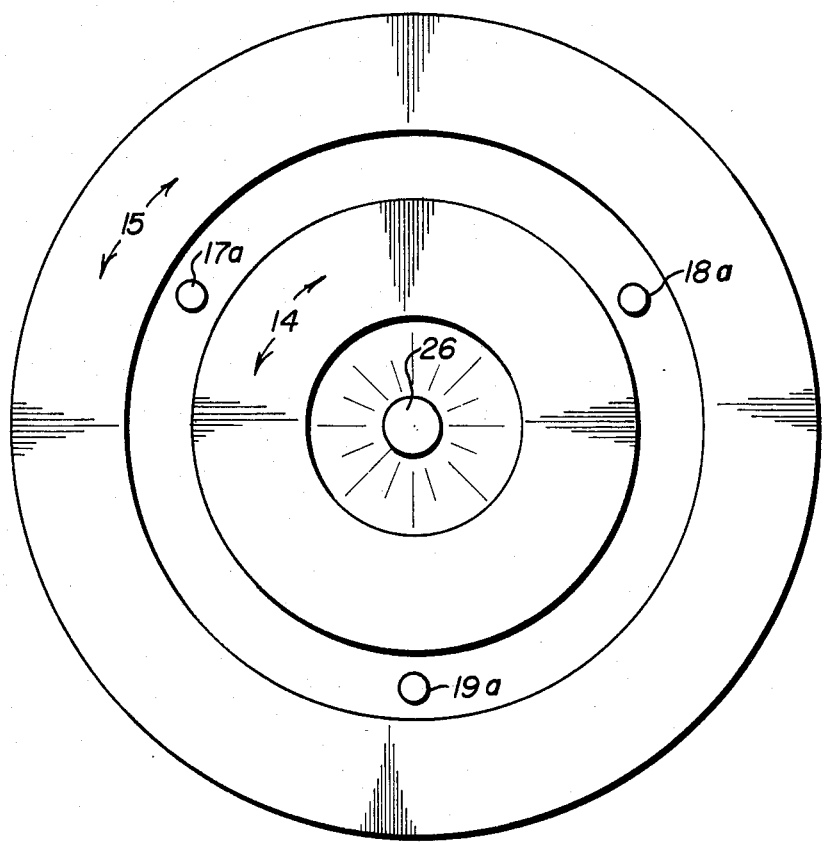
FIG. 3 is a top schematic view of the base assembly.

With reference to the 120 degree radial cross-sectional view of FIG. 1, there is shown a suspended assembly 10 and a base assembly 12. The description of all further components of the present invention are integral with either said suspended assembly 10 or said base assembly 12, as is more particularly described below.

The base assembly 12 includes a narrow beam source of electromagnetic energy 26 disposed substantially at the radial center of the entire base assembly. Further included within the base assembly 12 is a first toroidal magnet 14 surrounding said energy source 26 in which the said first toroidal magnet 14 possesses an axis of polarity which is transverse to its toroidal plane.

Further components of the base assembly 12 include first anti-spin magnets 17A, 18A and 19A (see FIG. 3), which are disposed beyond the outer toroidal radius of said first toroidal magnet 14 in which said anti-spin magnets possess the same axis of polarity as said first toroidal magnet 14, but possess an opposite direction of polarity (within the same axis). That is, the anti-spin magnets 17A, 18A and 19A possess magnetic fields which have parallel axes, but are opposite in direction to the magnetic field of the first toroidal magnet 14.

Beyond the radius of the anti-spin magnets 17A, 18A and 19A is disposed a stabilizing toroidal magnet 15 having the same axis of polarity as the said first toroidal magnet 14 and, as well, having the same direction of polarity of its magnetic field as does said first toroidal magnet 14.

The entire base assembly 12 is set within, as shown in FIG. 1, a stable base capable of holding the magnets 14, 15, 17A, 18A and 19A (see FIG. 3), as well as the narrow beam electromagnetic energy source 26.

The suspended assembly 10 (see FIGS. 1 and 2) includes an energy receiving and conversion means 27 which, in a preferred embodiment, comprises a cluster of photo-voltaic cells, which serves to receive the energy transmitted by energy source 26 and to convert same into electrical energy usable by a motor 25 mounted upon said energy receiving and converting means 27. Said motor 25 possesses an axis of rotation which is in alignment with the axial center of said first toroidal magnet 14 and, as well, is located at the axial center of a second toroidal magnet 16 which surrounds said motor 25.

The second toroidal magnet 16 is radially connected by a drive shaft 22 and radial shafts 23 to said second toroidal magnet 16 which is disposed parallel to the surface defined by said radiant energy receiving and converting means 27. As noted in FIG. 1, the second toroidal magnet 16 is disposed above the floor of the receiving and converting means 27 in order to permit sufficient distance for rotation of the second toroid 16 on its axial drive shaft 22. It is noted that the second toroid 16 is aligned parallel to the first toroid 14 and exhibits a magnetic field opposite in polarity thereto so as to create a natural repulsion between said first toroid 14 and second toroid 16.

Beyond the radius of the second toroid 16 are disposed second anti-spin magnets 17, 18 and 19 which are in magnetic alignment and in attractive polarity to said first anti-spin magnets 17A, 18A and 19A (see FIGS. 1 and 3). The purpose of said three sets of anti-spin magnets is to provide the stable, fixed circumferential mechanical element necessary in all gyroscopic phenomena.

Through the attraction of three sets of anti-spin magnets, a high degree of stability of the platform defined by the energy receiving and converting means 27 is assured. Such a stable platform, upon which the drive shaft 22 of the motor 23 can rotate, is necessary in order to satisfy the basic mechanical requirements of a gyroscopic system.

Further stability of the platform assembly 10 is afforded through the function of stabilizing toroidal magnet 15 and its magnetic field 20 which (see FIG. 1) interacts with the magnetic magnetic field 22 of the first toroid 14 and the magnetic field 21 of the second toroid to create a "magnetic triad" of fields which will provide the necessary degree of stability to the suspended assembly 10.

It is to be appreciated that the laws of gyroscopic effect will keep the suspended unit 10 normally stabilized in a horizontal plane once it is originally so oriented. It is noted that the distance 13 between the first toroid 14 and second toroid 16 is determined by the size and properties of the respective toroidal magnets. The preferred material for the magnets is a cobalt rare earth permanent magnet having the following properties:

Residual induction (Br) GAUSS=8,700.
Coercive force (Hc) oersteds=8,200.
Intrinsic coercive force (Hci) oersteds= >15,000.
Energy product (BxH) max., mgo=18.
Recoil permeability=1.05.
Hardness, vickers D.P.H.=500.
Specific gravity, density grams/cm$^3$=8.3.
Tensile strength, p.s.i.=5,000.
Resistivity, p, micro ohm−cm@25° C.=50.

The specifications and outstanding properties of the so-called Hicorex permanent magnets render the same especially suitable for the present application requiring, thereby, only minimum size and weight. The Hicorex magnet also exhibits the greatest resistance to demagnetization of all available magnetic materials. All magnets are ground in all dimensions to a tolerance of ±0.001".

The toroidal magnets 14 and 16 are equal in diameter, size and weight. The outer stabilizing magnet 15 is of a larger diameter (see FIGS. 1 and 3).

The suspended unit also includes an outer shell 11A. All internal metallic supporting units will be formed of magnesium, which is believed to be the lightest and strongest non-magnetic metal. It is necessary that the shell 11A as well as the metal used in drive shaft 22, radial element 23 and possibly the motor 25 itself be non-magnetic so as not to interfere with the magnetic fields 20, 21 and 22 which suspend the suspended assembly.

The motor 25 turns the drive shaft 22 which will turn the radially connecting means 23, and, thus, the magnetic toroid 16 will rotate. This rotation is of sufficient rpm gyroscopic force to keep the elements of suspended assembly 10 in its horizontal plane and preventing magnetic field 21 from extending over magnetic field 20.

It is found that the energy source 26 may comprise simply a light source of sufficient wattage to activate the photo-voltaic cell clusters within receiving and converting means 27 located on the underside of the suspended assembly. The photo-voltaic cells must be high output and of sufficient strength to power the motor 25 at a required rate of rotation.

It is noted that each set of anti-spin magnets are set 120° apart. The purpose of the anti-spin magnets is to counteract the expected spinning effect of the receiving and converting means 27 and the shell 11A caused by friction on the bearings connecting the motor 25 to the shell 11A. Also, the anti-spin magnets are necessary in order to prevent the torque of the motor 25 from inducing rotation of the shell 11A.

As above noted, the anti-spin magnets are of north pole orientation within the suspended unit 10 and of south pole orientation within the base assembly 12. They exhibit only the amount of attraction necessary to keep the shell 11A from revolving with the suspended toroid 16.

In operation, the suspended assembly 10 will be mechanically held in a horizontal plane above the base assembly 12 until the photo-voltaic cells have been activated and the motor causes sufficient rpm upon the suspended toroid 16 to achieve horizontal stability.

The second toroid 16, its magnesium casing 11A, and the connecting radial plate 23 are perfectly balanced and symmetrical in their construction so that the gyroscope effect will be effective and will enable proper functioning of the device.

In FIG. 1 it is noted that the circular field 22 from the first toroid 14 repulses circular field 21 of the suspended second toroid to cause actual suspension of the floating assembly 10.

As is illustrated in FIG. 1, the distance 13 of floating assembly 10 above the base assembly 12 will be approximately four to six times the thickness of the toroidal magnets (although greater distances are theoretically possible), this being due to the high repulsive capability of the Hicorex permanent magnet.

It is noted that in lieu of the light source 26, there may be provided a microwave energy source. Such microwave energy source would have to be "narrow beam" so as not to interfere with any of the magnetic fields.

It is also to be appreciated and understood that a further set of magnets, in a mirrored configuration of base assembly 12, may be positioned above the suspended assembly 10 to, in effect, add a second level base assembly. Such positioning creates extra stability above the suspended assembly 10 and could be utilized wherever such additional stability is required.

It is further noted that the present system is devoid of any active control loops, thus approaching statics without computer stabilized or controlled electromagnets; and thereby, once in operation, is capable of indefinite suspension.

The present device is of advantage in both scientific and non-scientific areas in that the suspension of matter is achieved without physical or mechanical constraints. More particularly, the invention's scientific applications include use in inertial guidance systems, use in magnetically-suspended rail transporation systems, and use in suspending various aerodynamic configurations in wind tunnel testing. Non-scientific applications of the invention include its role as a component in artistic expressions; for example, as used in a floating disk wherein the base unit is set within a cylindrical marble structure and the floating unit displays an embossed insignia, logo and/or ornamental design.

Having thus described my invention, what I claim as new, useful and non-obvious and, accordingly, secure by Letters Patent of the United States is:

1. A gyroscopically stabilized magnetic suspension system, comprising:
  (A) a base assembly comprising:
    (i) a directed source of electromagnetic energy disposed substantially at the radial center of said assembly;
    (ii) a first toroidal magnet surrounding said source of electromagnetic energy, said first toroidal magnet having an axis of polarity transverse to its toroidal plane; and
    (iii) first anti-spin magnets disposed beyond the outer toroidal radius of said first toroidal magnet, said anti-spin magnets having the same axis of polarity as said first toroidal magnet but having an opposite polarity thereto; and
  (B) a suspended assembly, comprising:
    (i) electromagnetic energy receiving and converting means;
    (ii) a motor disposed upon said energy receiving and converting means, having a drive shaft disposed along the axis defined by the axial center of said first toroidal magnet, said motor powered by the output of said energy receiving and converting means;
    (iii) a second toroidal magnet surrounding said motor and radially connected to the drive shaft of said motor, said second toroidal magnet disposed parallel to the plane of said first toroidal magnet, said second toroidal magnet having a polarity transverse to its toroidal plane, said polarity opposite to the polarity of the first toroidal magnet to thereby form a repulsion mode therebetween; and
    (iv) second anti-spin magnets disposed axially above said first anti-spin magnets, said second anti-spin magnets having the same polarity as said first anti-spin magnets to thereby form an attraction mode therebetween,
  whereby the rotation of the drive shaft of said motor will induce a rotation of said second toroidal magnet at a velocity defined by said energy receiving and converting means, and said anti-spin magnets radially beyond said second toroid will define a gyroscopic plane of reference within which said second toroidal magnet will function as a gyroscope.

2. The system as defined in claim 1 in which said base assembly further comprises:
  (iv) a stabilizing toroidal magnet annularly disposed beyond the radius of said first magnet, said stabilizing magnet having the same direction of polarity as said first toroidal magnet,
  whereby a toroidal field of repulsion, near the outer radius of the attractive field of the anti-spin magnets is formed thereby compressing and thus stabilizing both the attractive anti-spin field and the repulsive field between the first and second toroids.

* * * * *